(12) United States Patent
Hsieh

(10) Patent No.: US 8,396,110 B1
(45) Date of Patent: Mar. 12, 2013

(54) COMBINED DECISION FEEDBACK AND LINEAR EQUALIZATION

(75) Inventor: Cheng-Hsiang Hsieh, Los Gatos, CA (US)

(73) Assignee: Xilinx, Inc., San Jose, CA (US)

( * ) Notice: Subject to any disclaimer, the term of this patent is extended or adjusted under 35 U.S.C. 154(b) by 74 days.

(21) Appl. No.: 12/960,050

(22) Filed: Dec. 3, 2010

(51) Int. Cl.
*H03H 7/30* (2006.01)

(52) U.S. Cl. ........ 375/233; 375/229; 375/230; 375/231; 375/232

(58) Field of Classification Search .................. 375/230, 375/231, 232, 233
See application file for complete search history.

(56) References Cited

U.S. PATENT DOCUMENTS

| | | | |
|---|---|---|---|
| 8,050,318 B2 * | 11/2011 | Phanse et al. | 375/232 |
| 8,098,722 B2 * | 1/2012 | Kim et al. | 375/232 |
| 2009/0316769 A1 * | 12/2009 | Hidaka et al. | 375/233 |

* cited by examiner

*Primary Examiner* — Dhaval Patel
(74) *Attorney, Agent, or Firm* — LeRoy D. Maunu

(57) ABSTRACT

In one embodiment, a receiver circuit is provided. The receiver circuit includes a low-power equalization circuit having a first linear equalization circuit coupled to receive serial data. The receiver circuit includes a low-noise equalization circuit having a second linear equalization circuit coupled to receive the serial data, and a non-linear equalization circuit coupled to an output of the second linear equalization circuit. The receiver circuit includes a control circuit configured to enable the low-power equalization circuit and disable the low-noise equalization circuit in response to a first state of a control signal. The control circuit is configured to disable the low-power equalization circuit and enable the low-noise equalization circuit in response to a second state of the control signal.

20 Claims, 4 Drawing Sheets

COMBINED DECISION FEEDBACK AND LINEAR EQUALIZATION

FIELD OF THE INVENTION

One or more embodiments generally relate to communications, and more particularly to communication signaling.

BACKGROUND

Many programmable integrated circuits (ICs) are configured to receive and/or transmit a high-speed digital data stream from and to other digital devices in a system along a data channel ("channel"). An ideal incoming digital data stream would have a series of square-wave-type pulses with vertical leading and trailing edges and a flat ideal. However, incoming digital data streams are not perfect. Deviation from ideality can be caused by frequency-dependent attenuation of the channel over which the data is transmitted. For example, if the channel, such as a wire trace on a printed circuit board or transmission line, presents more attenuation at higher frequencies than at lower frequencies, phase distortion of the incoming digital data stream can occur.

Inter-symbol interference ("ISI") causes bits in a data stream to deviate from ideal. Each bit of incoming data is "stretched" by its adjacent bits and other bits in the data stream. The resultant incoming digital data stream has pulses with sloped leading and trailing edges and rounded corners. For example, the first bit adds a small amount of voltage to the second bit to produce a summed waveform that is unlike either the first or second bit.

At the end of a long serial data communication, such as in systems with serializer/de-serializer ("SERDES") receivers, the incoming waveform might not look like the waveform that was sent from the data-transmitting device. SERDES receivers are used in programmable ICs, such as field programmable gate arrays (FPGAs). To compensate for these changes in the incoming waveform, equalization is applied to correct the received signal.

SERDES transceivers generally utilize various equalizers to compensate for ISI. One equalization method, known as continuous-time linear equalization (CTLE), utilizes active circuitries to boost the gain at various frequencies and compensate for the channel loss. CTLE provides a hardware and power-efficient solution for equalization. However, linear equalizers amplify all frequencies within the equalizer bandwidth, including cross-talk and ripple. As a result, CTLE does not provide an ideal solution in for high-frequency compensation, which may be subject to various noise sources.

Another equalization method is decision-feedback equalization ("DFE"). DFE applies a selected correction signal (e.g. voltage or current) to an input bit at a summing node that compensates for the frequency-dependent attenuation of the channel carrying the data to the receiver. In some systems, DFE is essentially the inverse function of the channel attenuation as a function of frequency. DFE can equalize with higher immunities against effects from many types of unwanted signals (cross-talk, reflections, and other general electronic noise), but also increases hardware complexity and power requirements.

When performance, power efficiency, and hardware requirements are considered, different application environments may be better suited to one particular equalization method over the other. Because the ultimate application of a programmable IC is unknown, designers of SERDES for programmable ICs routinely face the challenge of achieving lowest power possible, while keeping the designs flexible so they can address an extremely wide range of applications.

One solution is to implement both types of equalizers on the programmable IC, with some channels using DFE and some channels using CTLE. However, this approach is not optimal because some applications may exhaust a particular type of channel while leaving channels of the other type unused. Using a DFE for applications that can be performed with CTLE wastes power. Conversely, a CTLE channel often cannot serve in an environment that is only meant to be served by DFE.

One or more embodiments of the present invention may address one or more of the above issues.

SUMMARY

In one embodiment, a receiver circuit is provided. The receiver circuit includes a low-power equalization circuit having a first linear equalization circuit coupled to receive serial data. The receiver circuit also includes a low-noise equalization circuit having a second linear equalization circuit coupled to receive the serial data and a non-linear equalization circuit coupled to an output of the second linear equalization circuit. The receiver circuit includes a control circuit configured to enable the low-power equalization circuit and disable the low-noise equalization circuit in response to a first state of a control signal. The control circuit is configured to disable the low-power equalization circuit and enable the low-noise equalization circuit in response to a second state of the control signal.

In another embodiment, an integrated circuit (IC) is provided. The IC includes a plurality of configurable serializer/deserializer (SERDES) circuits. Each of the SERDES circuit has a transmitter circuit and a receiver circuit coupled to programmable routing resources. The receiver circuit includes a low-power equalization circuit with a first continuous-time-linear-equalization (CTLE) circuit coupled to receive serial data. The first CTLE circuit is configured to equalize signals in a low-frequency range and in a high-frequency range above the low-frequency range. The receiver circuit also includes a low-noise equalization circuit coupled to receive the serial data. The low-noise equalization circuit includes a second CTLE circuit and a decision feedback equalization (DFE) circuit coupled to an output of the second CTLE circuit. The second CTLE circuit is configured to equalize signals in the low-frequency range; and the DFE circuit is configured to equalize signals in the high-frequency range. An output deserialization circuit is coupled to outputs of the low-power and low-noise equalization circuits. A control circuit configured to enable the first CTLE circuit and disable the low-noise equalization circuit in response to a first state of a control signal, and to disable the first CTLE circuit and enable the low-noise equalization circuit in response to a second state of the control signal.

In yet another embodiment, an equalizer circuit is provided. The equalizer circuit includes a low-power equalization circuit having a first continuous time linear equalization (CTLE) circuit coupled to a receiver circuit for receiving serial data. The equalizer circuit includes a low-noise equalization circuit having a second CTLE circuit coupled to receive the serial data and a decision feedback equalization (DFE) circuit coupled to an output of the second CTLE circuit. The equalizer circuit includes a control circuit configured to enable the low-power equalization circuit and disable the low-noise equalization circuit in response to a first state of a control signal. The control circuit is configured to disable the low-power equalization circuit and enable the low-noise equalization circuit in response to a second state of the control signal.

It will be appreciated that one or more other embodiments are set forth in the Detailed Description and Claims which follow.

BRIEF DESCRIPTION OF THE DRAWINGS

Various aspects and advantages of one or more embodiments will become apparent upon review of the following detailed description and upon reference to the drawings in which.

DETAILED DESCRIPTION OF THE DRAWINGS

One of more embodiments provide a power-efficient circuit that may be configured to provide either low-power or low-noise equalization. The circuit includes a low-power equalizer implementing CTLE alongside a low-noise equalizer implementing DFE. The circuit is configurable to operate one of the low-power or low-noise equalizers. In circuit arrangements that are not structured according to one or more embodiments, disabling the unused equalizer may reduce power, but the disabled circuitry may continue to consume a significant amount of power. For example, in one example arrangement, if a low-power CTLE equalizer is coupled in series with the low-noise DFE equalizer, the disabled equalizer must continue to operate as a buffer even when disabled in order to communicate signals to or from the active equalizer. Even where the DFE and CTLE are combined in parallel, load resistance of inputs of a disabled equalizer may drain power. In the one or more embodiments, a low-power equalizer is provided alongside a low-noise equalizer in a circuit arrangement that minimizes power consumption. Each equalizer path is individually optimized for low power without being burdened by the junction loadings from unused blocks of the other path.

Aspects of one or more embodiments may best be described with reference to an example application. For ease of illustration, the disclosed embodiments are primarily described with reference to a receive channel of a SERDES circuit implementation. One skilled in the art will recognize the described embodiments may be applied and utilized outside of the SERDES context as well.

Figure 1:
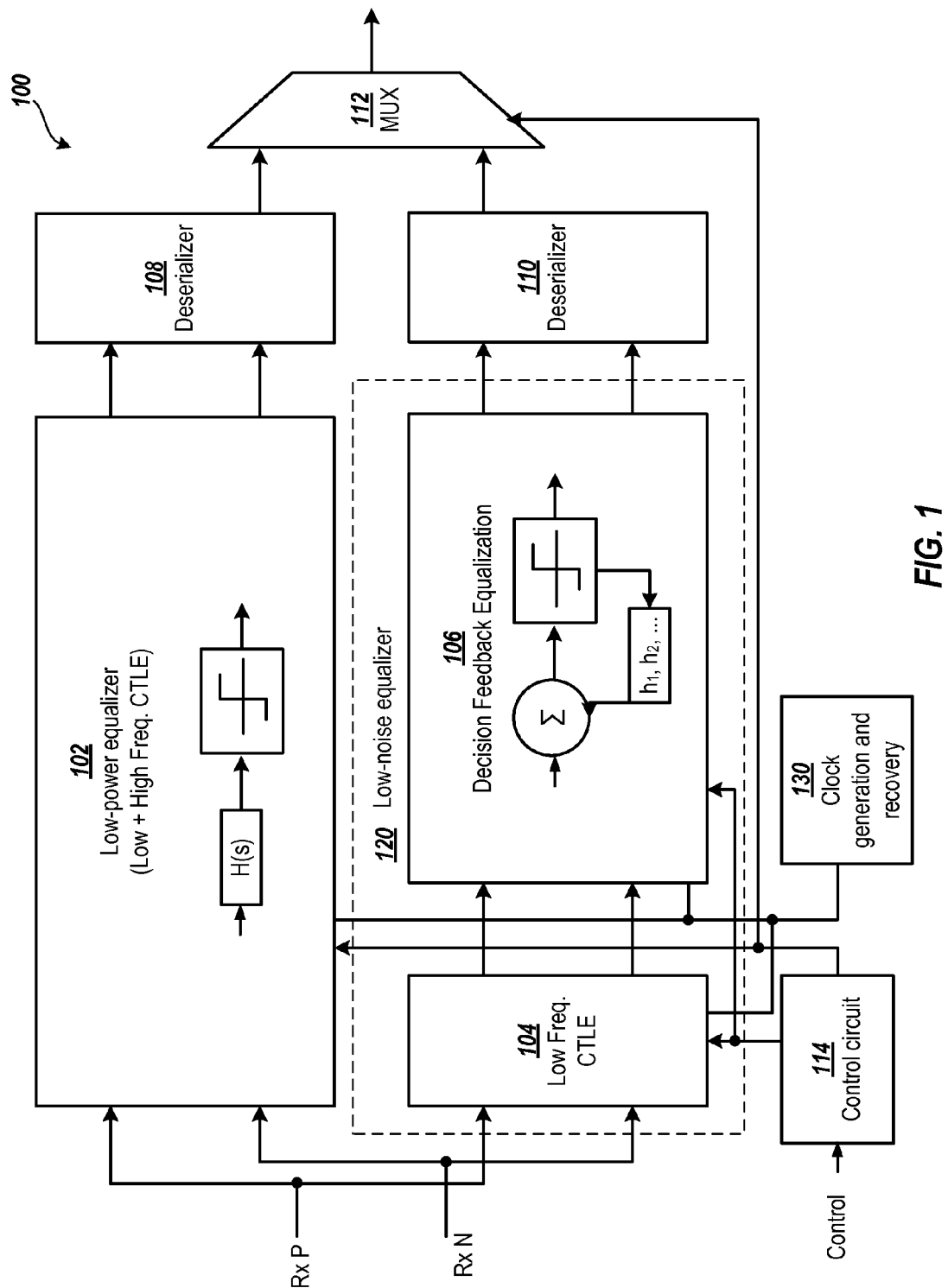
FIG. 1 shows a circuit diagram of an example serializer/deserializer SERDES.

FIG. 1 shows a circuit diagram of an example receiver circuit configured in accordance with one or more embodiments. The illustrated receiver circuit 100 includes a low-power equalizer 102 implemented alongside a low-noise equalizer 120. The low-power equalizer 102 implements a CTLE and the low-noise equalizer 120 implements a DFE.

One skilled in the art will recognize that some DFE implementations may have a limited effective equalization range. For example, many DFEs may only effectively equalize a frequency range from DC to the Nyquist frequency divided by the number of taps in the DFE. In this example implementation, the low-noise equalizer 120 includes a low-frequency CTLE 104 arranged in series with DFE 106 to help the DFE achieve better eye-opening and to equalize a wider frequency range. The low-power circuit 102 includes low-frequency CTLE and high-frequency CTLE circuitry (not shown) to provide equalization across a wide frequency range. A control circuit 114 enables a selected one of the equalizers and disables the other one of the equalizers to reduce power consumption.

The low-power equalizer 102 includes CTLE circuitry configured to equalize signals in a low-frequency range and in a high-frequency range above the low-frequency range. The CTLE 104 of the low-noise equalizer 120 is configured to equalize signals in the low-frequency range and the DFE circuit 106 is configured to equalize signals in the high-frequency range.

It is noted that, in this example, the low-power and low-noise equalizers, 102 and 120, each include low-frequency CTLE circuits. To reduce die space consumed by the receiver circuit 100, a designer may be motivated to implement the low-power and low-noise equalizers (102 and 120) with a shared low-frequency CTLE circuit. However, if the signal path is split after the low-frequency CTLE, the inputs of the disabled equalizer may include the load placed on output transistors of the low-frequency CTLE circuitry, causing additional power consumption. In one or more embodiments, the signal path is split at the input bond pads (not shown) of the receive channel (Rx), which are insensitive to small increases in loading because of a typical 50 Ohm termination resistance present at the input bond pads. The input bond pads have high loading as a result of electrostatic discharge (ESD) protection structures (not shown) and the routing wires (not shown). The addition of extra load from the disabled path results in a mild increase in load. This small change in load can be addressed by adjusting the values of inductors (not shown) placed on the input bond pads for achieving good return-loss performance.

In addition to the input bond pads and ESD protection, the low-power and low-noise equalization circuits may share other circuits to reduce power consumption and hardware. For example, each of the equalizers may share clock generation and recovery circuitry (130), such as phase lock-loop circuits, phase interpolation, clock dividers, etc.

Figure 2:
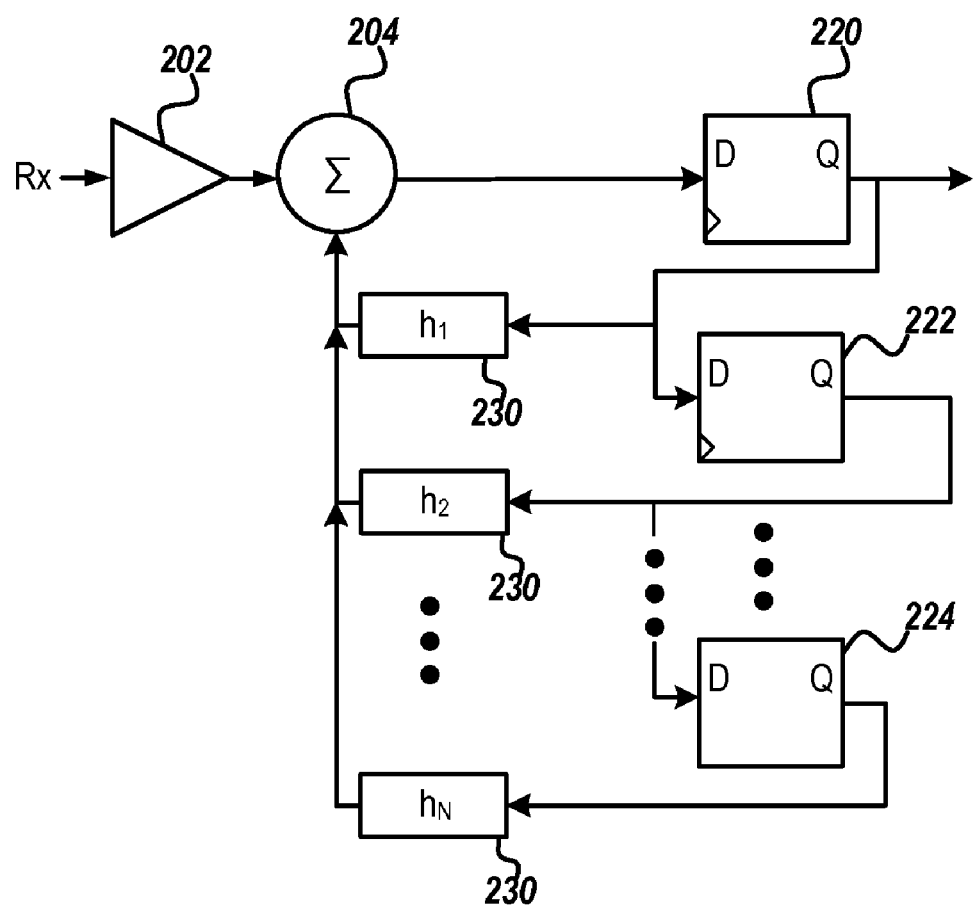
FIG. 2 shows a circuit diagram of one example DFE implementation.

The low-power and low-noise equalizers 102 and 120 contain capture flip-flops to determine and buffer the digital output. One reason the DFE consumes more power is because the DFE usually needs to drive capture flip-flops. The extra capture flip-flops are used to collect error-slicer data, which is necessary for the tap adaption logic. Past decisions are weighted and fed-back to a summing node to provide correction. For example, FIG. 2 shows a circuit diagram of an example DFE implementation. In this example, input buffer 202 receives serial data input (Rx). A summation circuit 204 is coupled to the input buffer 202 and sums input serial data with feedback signals from n taps 230. A number of capture flip-flops 220-224 are coupled in series to an output of the summation circuit and are configured to slice and buffer data sampled for error correction. The flip-flops may be D flip-flops. The first capture flip-flop 220 stores an equalized output for each input data sample. Additional flip-flops 222-224 are needed in the DFE to buffer previous data values for error correction.

Taps 230 are coupled to receive the buffered data values from the capture flip-flops 220-224 and filter the buffered data values to cancel out errors when summed with input Rx by summation circuit 204. The additional capture flip-flops 222-224 are not needed for the CTLE equalization implemented by the low power equalizer 102, which is shown in FIG. 1. By implementing each equalizer with separate sets of capture flip flops, unused capture flip-flops can be disabled to reduce power consumption. One skilled in the art will recognize that the DFE equalizer shown in FIG. 2 is an example and alternative implementations known in the art may be suitable.

In some DFE implementations, even more capture flip-flops are used to perform speculative schemes, such as loop-unwinding, which may be necessary to circumvent some internal timing bottlenecks. These additional flip-flops may waste power if not disabled when not in use. In one or more embodiments, separate capture flip-flops may be implemented for each of the low-power and low-noise equalizers. In this manner, the minimum number of capture flip flops may be enabled to reduce power consumption.

Following each of the equalizers 102 and 120, a respective deserializer 108 and 110 is provided to convert serial signals to parallel. A multiplexor (MUX) selection circuit 112 is coupled to outputs of the deserializer in order to select the deserialized output from the active one of the equalizer paths.

Figure 3:
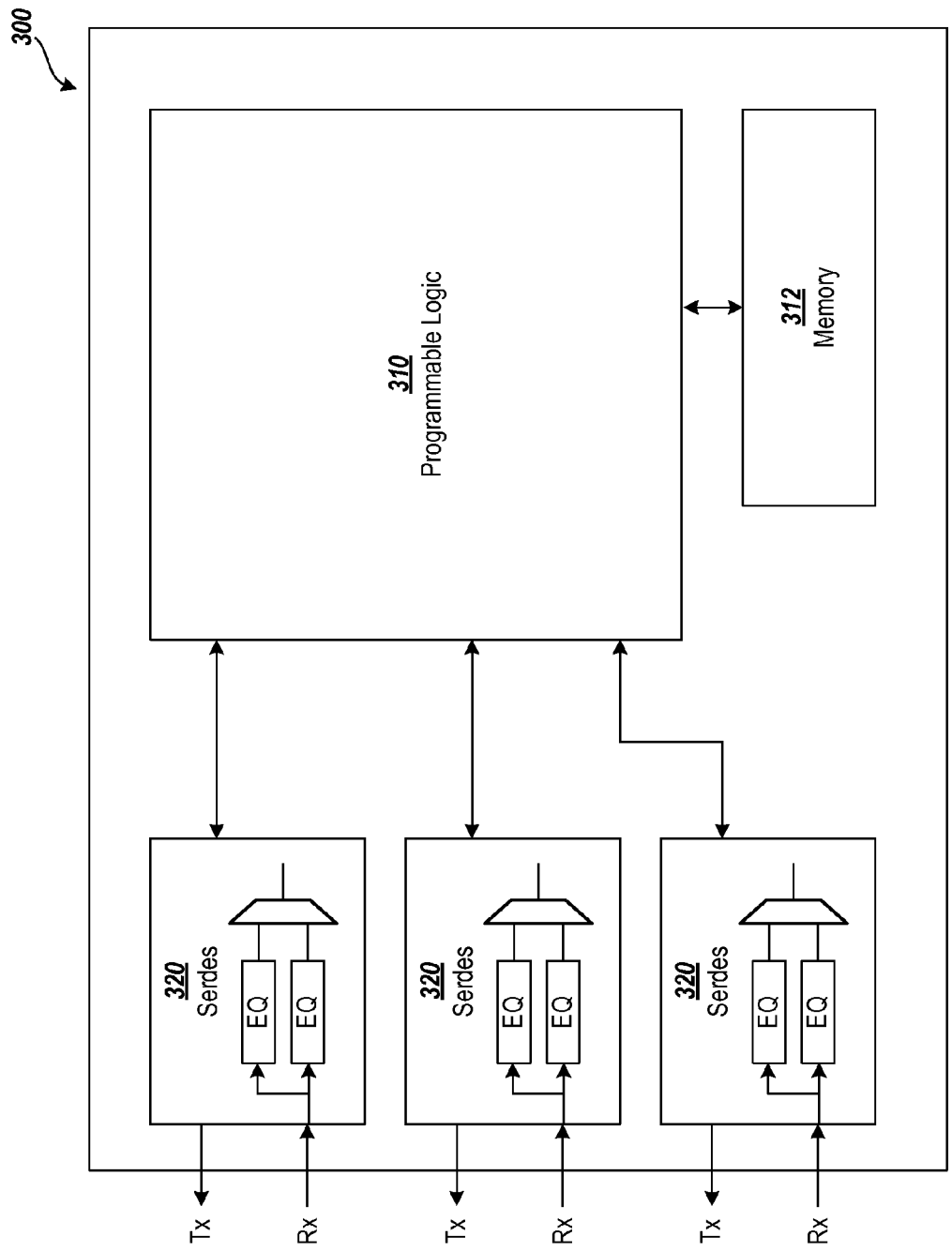
FIG. 3 shows an example programmable IC architecture.

FIG. 3 shows an example programmable IC architecture. In this example, programmable IC 300 includes programmable logic fabric 310, a plurality of SERDES transceivers 320, and memory 312. Each SERDES circuit includes a transmitter circuit and a receiver circuit (not shown). As discussed above, the SERDES receive channel may be equalized using either the low-power equalizer 102 or low-noise equalizer 120.

In general, each SERDES 320 performs a serial-to-parallel conversion on receive data and performs a parallel-to-serial conversion on transmit data. Each SERDES transceiver provides an external transmit channel TX and an external receive channel RX. The parallel interface may be any width and need not be on byte boundaries. The programmable logic fabric generates control signals to program the transceiver in each SERDES circuit 320 for a desired transmission rate to conform to the transmission standard. Additionally, the transmitter section and receiver section in each MGT may be programmed to support separate transmission standards. Because the receiver of the SERDES circuits 320 may be configured to utilize a low-power equalizer or a low-noise-equalizer, the programmable IC allows greater flexibility for application environments.

Figure 4:
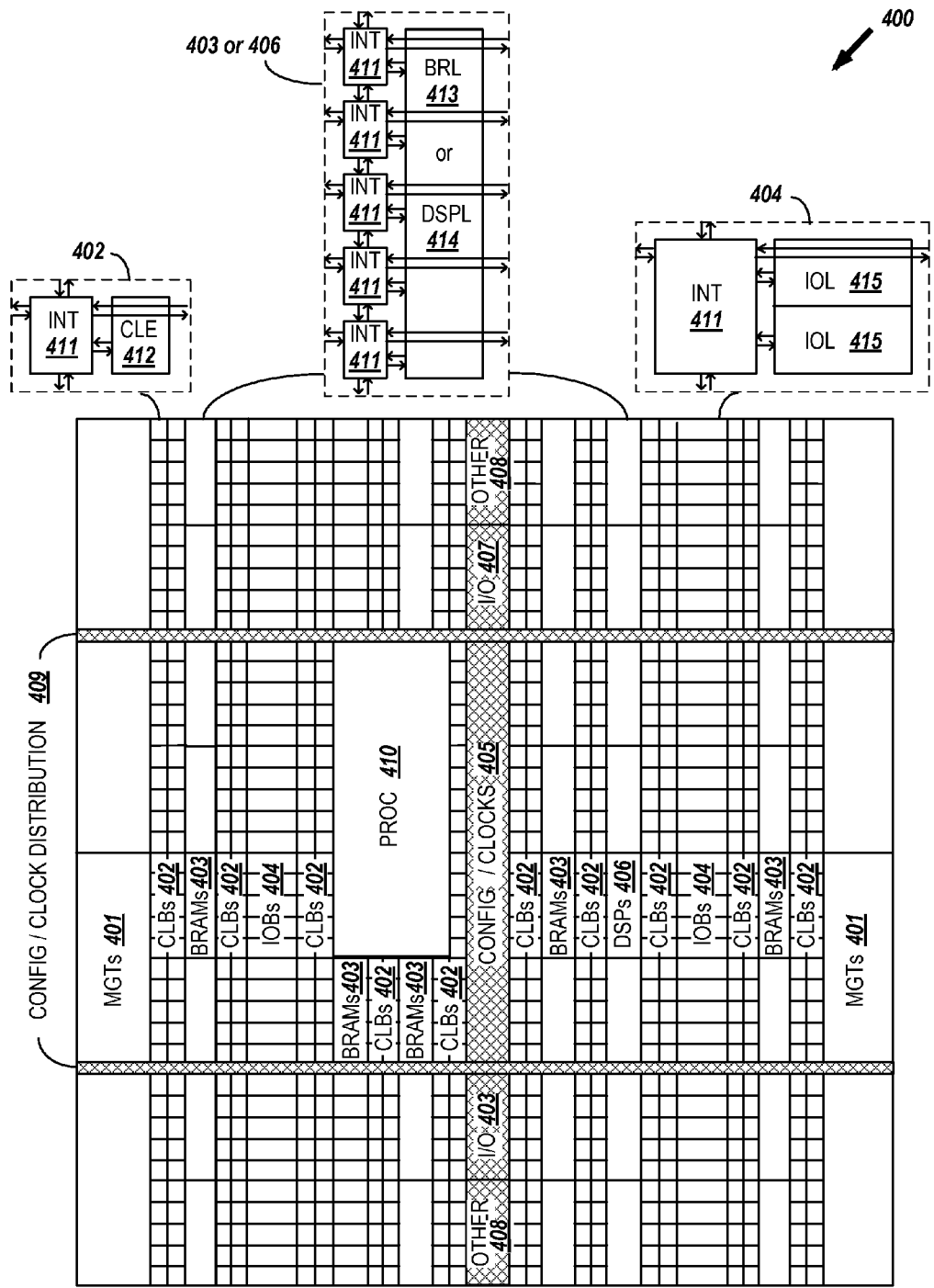
FIG. 4 shows an example FPGA.

FIG. 4 is a block diagram of an example programmable integrated circuit. As previously described, a programmable IC may include a plurality of SERDES circuits to implement input and output communication.

FPGAs can include several different types of programmable logic blocks in the array. For example, FIG. 4 illustrates an FPGA architecture (400) that includes a large number of different programmable tiles including multi-gigabit transceivers (MGTs) 401, configurable logic blocks (CLBs) 402, random access memory blocks (BRAMs) 403, input/output blocks (IOBs) 404, configuration and clocking logic (CONFIG/CLOCKS) 405, digital signal processing blocks (DSPs) 406, specialized input/output blocks (I/O) 407, for example, clock ports, and other programmable logic 408 such as digital clock managers, analog-to-digital converters, system monitoring logic, and so forth. Some FPGAs also include dedicated processor blocks (PROC) 410 and internal and external reconfiguration ports (not shown).

In some FPGAs, each programmable tile includes a programmable interconnect element (INT) 411 having standardized connections to and from a corresponding interconnect element in each adjacent tile. Therefore, the programmable interconnect elements taken together implement the programmable interconnect structure for the illustrated FPGA. The programmable interconnect element INT 411 also includes the connections to and from the programmable logic element within the same tile, as shown by the examples included at the top of FIG. 4.

For example, a CLB 402 can include a configurable logic element CLE 412 that can be programmed to implement user logic, plus a single programmable interconnect element INT 411. A BRAM 403 can include a BRAM logic element (BRL) 413 in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 406 can include a DSP logic element (DSPL) 414 in addition to an appropriate number of programmable interconnect elements. An IOB 404 can include, for example, two instances of an input/output logic element (IOL) 415 in addition to one instance of the programmable interconnect element INT 411. As will be clear to those of skill in the art, the actual I/O bond pads connected, for example, to the I/O logic element 415, are manufactured using metal layered above the various illustrated logic blocks, and typically are not confined to the area of the input/output logic element 415.

In the pictured embodiment, a columnar area near the center of the die (shown shaded in FIG. 4) is used for configuration, clock, and other control logic. Horizontal areas 409 extending from this column are used to distribute the clocks and configuration signals across the breadth of the FPGA.

Some FPGAs utilizing the architecture illustrated in FIG. 4 include additional logic blocks that disrupt the regular columnar structure making up a large part of the FPGA. The additional logic blocks can be programmable blocks and/or dedicated logic. For example, the processor block PROC 410 shown in FIG. 4 spans several columns of CLBs and BRAMs.

Note that FIG. 4 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 4 are purely exemplary. For example, in an actual FPGA, more than one adjacent column of CLBs is typically included wherever the CLBs appear, to facilitate the efficient implementation of user logic.

One or more embodiments are described in terms of an FPGA. Those skilled in the art will appreciate, however, that the invention could be implemented in different FPGA architectures, other types of programmable logic devices (PLDs) other than FPGAs, integrated circuits that include programmable logic circuitry and/or adapted to various application requirements, based on both volatile and non-volatile technologies.

The embodiments are thought to be applicable to a variety of systems for equalization. Other aspects and embodiments will be apparent to those skilled in the art from consideration of the specification. The embodiments may be implemented as an application specific integrated circuit (ASIC), or as a logic on a programmable logic device. It is intended that the specification and illustrated embodiments be considered as examples only, with a true scope and spirit of the invention being indicated by the following claims.

What is claimed is:

1. A receiver circuit, comprising:
   a low-power equalization circuit including a first linear equalization circuit coupled to receive serial data;
   a low-noise equalization circuit including:
      a second linear equalization circuit coupled to receive the serial data; and
      a non-linear equalization circuit coupled to an output of the second linear equalization circuit; and a control circuit configured to:
  enable the low-power equalization circuit and disable the low-noise equalization circuit in response to a first state of a control signal; and
  disable the low-power equalization circuit and enable the low-noise equalization circuit in response to a second state of the control signal.

2. The receiver circuit of claim 1, wherein:
the first and second linear equalization circuits are continuous-time-linear-equalization (CTLE) circuits; and
the non-linear equalization circuit is a decision feedback equalization (DFE) circuit.

3. The receiver circuit of claim 1, wherein:
the low-power equalization circuit includes a first set of capture flip-flops coupled to an output of the low-power equalization circuit; and
the low-noise equalization circuit includes a second set of capture flip-flops coupled to an output of the low-noise equalization circuit.

4. The receiver circuit of claim 3, wherein the first set of capture flip flops has fewer flip-flops than the second set of capture flip flops.

5. The receiver circuit of claim 1, further comprising:
a first deserializer coupled to an output of the low-power equalization circuit;
a second deserializer coupled to an output of the low-noise equalization circuit; and
a selection circuit having first and second inputs respectively coupled an output of the first deserializer and an output of the second deserializer.

6. The receiver circuit of claim 1, further comprising:
a selection circuit having first and second inputs respectively coupled to an output of the low-power equalization circuit and an output of the low-noise equalization circuit; and
a deserializer coupled to an output of the selection circuit.

7. The receiver circuit of claim 6, further comprising:
a selection circuit having first and second inputs respectively coupled to an output of the low-power equalization circuit and an output of the low-noise equalization circuit; and
a deserializer coupled to an output of the selection circuit.

8. The receiver circuit of claim 2, wherein:
the second CTLE circuit is configured to equalize signals in a low-frequency range; and
the DFE circuit is configured to equalize signals in a high-frequency range above the low-frequency range.

9. The receiver circuit of claim 8, wherein the first CTLE circuit is configured to equalized signals in the low-frequency range and in the high-frequency range.

10. An integrated circuit (IC), comprising:
a plurality of configurable serializer/deserializer (SERDES) circuits, each of the plurality of SERDES circuits having a transmitter circuit and a receiver circuit coupled to programmable routing resources, the receiver circuit including:
  a low-power equalization circuit including a first continuous-time-linear-equalization (CTLE) circuit coupled to receive serial data, the first CTLE circuit configured to equalize signals in a low-frequency range and in a high-frequency range above the low-frequency range;
  a low-noise equalization circuit coupled to receive the serial data, the low-noise equalization circuit including:
    a second CTLE circuit, the second CTLE circuit configured to equalize signals in the low-frequency range; and
    a decision feedback equalization (DFE) circuit coupled to an output of the second CTLE circuit, the DFE circuit configured to equalize signals in the high-frequency range; and
  an output deserialization circuit coupled to outputs of the low-power and low-noise equalization circuits;
a control circuit configured to:
  enable the first CTLE circuit and disable the low-noise equalization circuit in response to a first state of a control signal; and
  disable the first CTLE circuit and enable the low-noise equalization circuit in response to a second state of the control signal.

11. The programmable IC of claim 10, wherein:
the low-power equalization circuit includes a first set of capture flip-flops coupled to an output of the low-power equalization circuit; and
the low-noise equalization circuit includes a second set of capture flip-flops coupled to an output of the low-noise equalization circuit.

12. The programmable IC of claim 10, wherein the first set of capture flip flops has fewer flip-flops than the second set of capture flip flops.

13. The IC of claim 10, further comprising:
a plurality of programmable resources coupled to the plurality of SERDES circuits;
a plurality of programmable routing resources for intercoupling the programmable resources; and
a plurality of configuration memory cells coupled to the programmable resource and to the programmable routing resources.

14. The IC of claim 10, wherein the output deserialization circuit includes:
a first deserializer coupled to an output of the low-power equalization circuit;
a second deserializer coupled to an output of the low-noise equalization circuit; and
a selection circuit having first and second inputs respectively coupled an output of the first deserializer and an output of the second deserializer.

15. The IC of claim 10, wherein the output deserialization circuit includes:
a selection circuit having first and second inputs respectively coupled to an output of the low-power equalization circuit and an output of the low-noise equalization circuit; and
a deserializer coupled to an output of the selection circuit.

16. The IC of claim 10, wherein the low-power equalization circuit and the low-noise equalization circuit are coupled to receiver bond pads of the respective SERDES circuit.

17. The IC of claim 10, wherein each of the plurality of SERDES circuits supports only one transmission channel.

18. The IC of claim 10, wherein each of the plurality of SERDES circuits includes a clock-recovery circuit, the clock-recovery circuit coupled to the low-power equalization circuit and to the low-noise equalization circuit.

19. An equalizer circuit, comprising
a low-power equalization circuit including a first continuous-time-linear-equalization (CTLE) circuit coupled to a receiver circuit, the first CTLE circuit configured to equalize frequencies in a low-frequency range and a high-frequency range above the low-frequency range;
a low-noise equalization circuit including:

a second CTLE circuit coupled to the receiver circuit, the second CTLE circuit configured to equalize frequencies in the low-frequency range; and a decision feedback equalization circuit coupled to an output of the second CTLE circuit, the decision feedback equalization circuit configured to equalize frequencies in the high-frequency range; and a control circuit configured to:

enable the low-power equalization circuit and disable the low-noise equalization circuit in response to a first state of a control signal; and disable the low-power equalization circuit and enable the low-noise equalization circuit in response to a second state of the control signal.

20. The equalizer circuit of claim 19, wherein:

the low-power equalization circuit includes a first set of capture flip-flops coupled to an output of the low-power equalization circuit; and the low-noise equalization circuit includes a second set of capture flip-flops coupled to an output of the low-noise equalization circuit.

* * * * *